(12) United States Patent
Dajaku

(10) Patent No.: US 12,113,411 B2
(45) Date of Patent: Oct. 8, 2024

(54) CLAW POLE ROTOR FOR AN ELECTRICAL MACHINE

(71) Applicant: FEAAM GmbH, Neubiberg (DE)

(72) Inventor: Gurakuq Dajaku, Neubiberg (DE)

(73) Assignee: FEAAM GmbH, Neubiberg (DE)

( * ) Notice: Subject to any disclaimer, the term of this patent is extended or adjusted under 35 U.S.C. 154(b) by 300 days.

(21) Appl. No.: 17/677,966

(22) Filed: Feb. 22, 2022

(65) Prior Publication Data

US 2022/0271638 A1    Aug. 25, 2022

(30) Foreign Application Priority Data

Feb. 23, 2021  (DE) ..................... 10 2021 104 270.4

(51) Int. Cl.
*H02K 21/04*    (2006.01)

(52) U.S. Cl.
CPC .................................. *H02K 21/044* (2013.01)

(58) Field of Classification Search
CPC .... H02K 21/044; H02K 1/2713; H02K 1/243; H02K 1/16
See application file for complete search history.

(56) References Cited

U.S. PATENT DOCUMENTS

| | | | | |
|---|---|---|---|---|
| 7,638,919 B2 * | 12/2009 | Pulnikov | ............... | H02K 21/145 310/257 |
| 10,461,614 B2 | 10/2019 | Dajaku | | |
| 2016/0065013 A1 * | 3/2016 | Chung | ................. | H02K 21/044 310/43 |

FOREIGN PATENT DOCUMENTS

| | | |
|---|---|---|
| CN | 106411006 | 2/2017 |
| DE | 102007035319 | 1/2009 |
| DE | 102007035320 | 1/2009 |
| DE | 112011103838 T5 | 9/2013 |
| DE | 102019130358 | 5/2021 |
| FR | 1262342 | 5/1961 |
| JP | 2013046508 A * | 3/2013 |

OTHER PUBLICATIONS

JP-2013046508-A_translate (Year: 2013).*
Küppers et al., "Numerical procedures for the calculation and design of automotive alternators," IEEE Transactions on Magnetics, Mar. 1997, vol. 33, No. 2, pp. 2022-2025.

(Continued)

*Primary Examiner* — Tulsidas C Patel
*Assistant Examiner* — Mohammed Ahmed Qureshi
(74) *Attorney, Agent, or Firm* — Morgan, Lewis & Bockius LLP

(57) ABSTRACT

A claw pole rotor for an electrical machine is provided, the claw pole rotor comprising a first claw pole component having a first yoke-shaft component to which at least two first claw pole fingers are connected, and a second claw pole component having a second yoke-shaft component to which at least two second claw pole fingers are connected, wherein the first claw pole fingers extend from a first side of the claw pole rotor towards a second side of the claw pole rotor, the second claw pole fingers extend from the second side towards the first side, and a magnet is arranged between the first yoke-shaft component of the first claw pole component and the second yoke-shaft component of the second claw pole component.

15 Claims, 8 Drawing Sheets

(56) References Cited

OTHER PUBLICATIONS

Kuroda et al., "Improvement of a claw pole motor using additional ferrite magnets for hybrid electric vehicles," IEEE 15th International Conference on Electric Machines, Sep. 2010, 3 pages.

Omri, et al., "3D-FEA based-comparison of different topologies of claw-pole alternators with a dual excitation," IEEE Thirteenth International Conference on Ecological Vehicles and Renewable Energies, 2018, 6 pages.

* cited by examiner

FIG. 5E
FIG. 5F
FIG. 5G
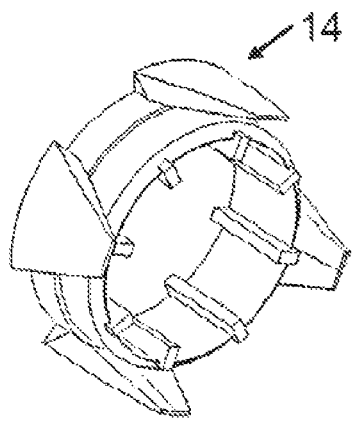
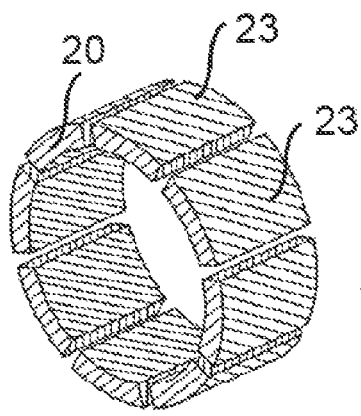
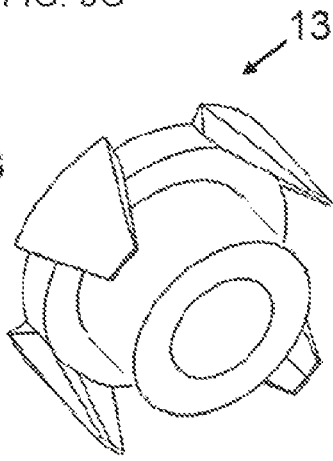
FIG. 6
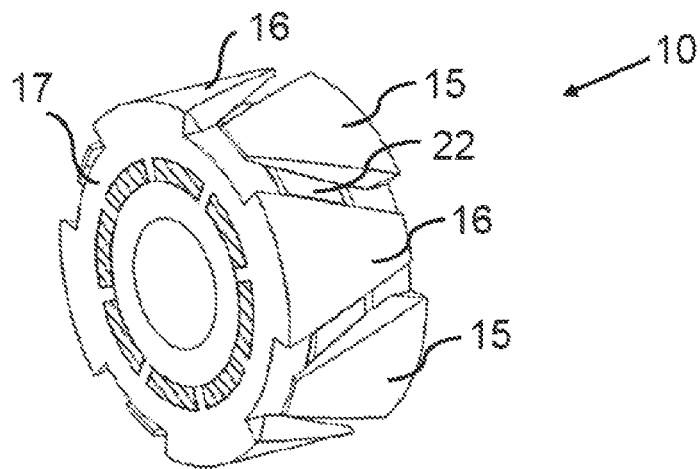
FIG. 7A
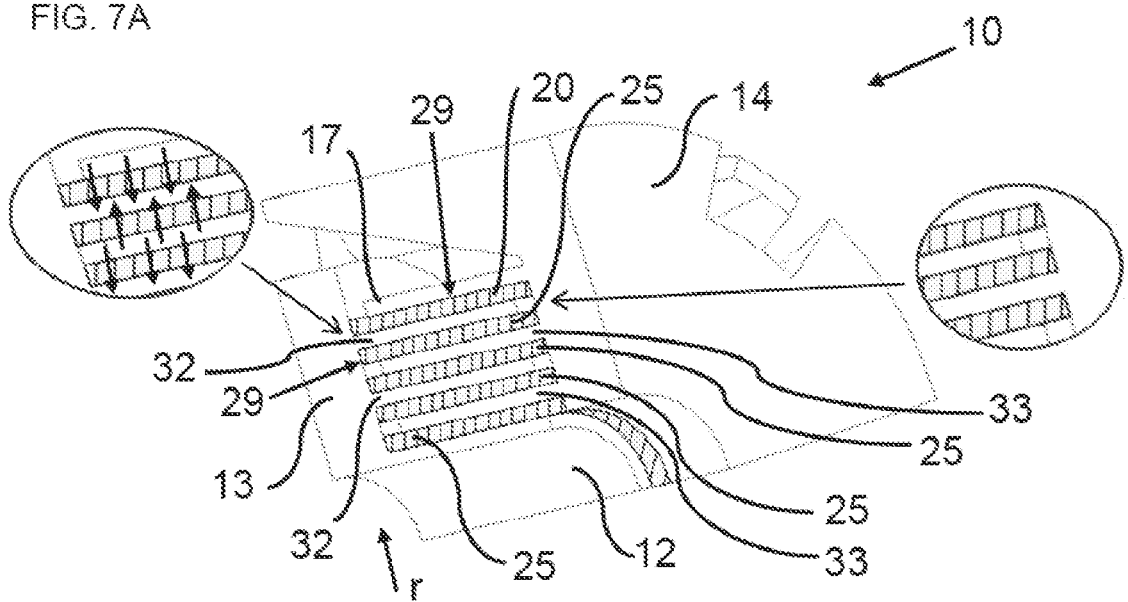

CLAW POLE ROTOR FOR AN ELECTRICAL MACHINE

The present application relates to a claw pole rotor for an electrical machine.

Typically, electrical machines comprise a stator and a rotor movable relative thereto. Electrical machines may operate as a motor or as a generator, converting electrical energy into kinetic energy or vice versa. In operation, a magnetic field of the rotor interacts with a magnetic field of the stator.

A claw pole rotor usually has two components with claw pole fingers. The claw pole fingers form magnetic poles of the claw pole rotor. With the aid of an excitation coil in the claw pole rotor, the magnetic flux in the rotor can be increased, resulting in a higher torque of the electrical machine including the claw pole rotor. This means that the electrical machine can be operated more efficiently.

An object to be achieved is to provide a claw pole rotor for an electrical machine which can be operated efficiently.

The object is achieved by the subject-matter of the independent claim. Advantageous embodiments and further developments are indicated in the subclaims.

According to at least one embodiment of the claw pole rotor for an electrical machine, the claw pole rotor comprises a first claw pole component having a first yoke-shaft component to which at least two first claw pole fingers are connected. The first claw pole component may further comprise a first annular component. The first annular component may be connected to the first yoke-shaft component. The first claw pole fingers may be connected to the first annular component. Thus, the first claw pole fingers may be connected to the first yoke-shaft component via the first annular component. The fact that the first claw pole fingers are connected to the first yoke-shaft component may mean that the first claw pole fingers are fastened to the first yoke-shaft component. Further, it is possible that the first claw pole fingers are fastened to the first annular component and hence are fixed to the first yoke-shaft component. The first claw pole fingers may be integrally formed with the first yoke-shaft component. Further, the first claw pole fingers may be integrally formed with the first yoke-shaft component and the first annular component. Alternatively, the first claw pole fingers may each be separate components that are connected to the first yoke-shaft component.

The first yoke-shaft component may comprise a rotor core. The first yoke-shaft component is arranged within the claw pole rotor at least in some places. The first yoke-shaft component may have shape of a hollow cylinder at least in some places. The first yoke-shaft component may comprise a ferromagnetic material, such as iron or steel. It is further possible that the first yoke-shaft component comprises soft magnetic powder composite materials.

The claw pole rotor further comprises a second claw pole component having a second yoke-shaft component to which at least two second claw pole fingers are connected. The second claw pole component may further comprise a second annular component. The second annular component may be connected to the second yoke-shaft component. The second claw pole fingers may be connected to the second annular component. Thus, the second claw pole fingers may be connected to the second yoke-shaft component via the second annular component. Alternatively, the second claw pole component does not have a second annular component and the second claw pole fingers are directly connected to the second yoke-shaft component. The fact that the second claw pole fingers are connected to the second yoke-shaft component may mean that the second claw pole fingers are fastened to the second yoke-shaft component. Further, it is possible that the second claw pole fingers are attached to the second annular component and hence are connected to the second yoke-shaft component. The second claw pole fingers may be integrally formed with the second yoke-shaft component. Further, the second claw pole fingers may be integrally formed with the second yoke-shaft component and the second annular component. Alternatively, the second claw pole fingers may each be separate components that are connected to the second yoke-shaft component.

The second yoke-shaft component is arranged within the claw pole rotor at least in some places. The second yoke-shaft component may have the shape of a hollow cylinder at least in some places. The second yoke-shaft component may comprise a ferromagnetic material, such as iron or steel. Further, the second yoke-shaft component may comprise soft magnetic powder composite materials.

The first and second claw pole fingers may all have approximately the shape of a parallelogram in an external view onto the claw pole rotor. As a whole, each of the claw pole fingers may have a curved shape. In each case, the curved shape of a claw pole finger extends along the circumference of the claw pole rotor. Each of the claw pole fingers may extend further along a longitudinal axis of the claw pole rotor than along the circumference of the claw pole rotor. The claw pole fingers may be arranged on an outer side of the claw pole rotor. The claw pole fingers may comprise the same material as the first yoke-shaft component and the second yoke-shaft component. That is, the claw pole fingers may comprise a ferromagnetic material, such as iron or steel. Further, it is possible for the claw pole fingers to comprise soft magnetic powder composite materials. The first claw pole fingers may all have the same size and shape. The second claw pole fingers may all have the same size and shape. It is further possible for all of the claw pole fingers, i.e. the first and second claw pole fingers, to all have the same size and shape. The claw pole rotor may have as many first claw pole fingers as second claw pole fingers.

The first claw pole fingers extend from a first side of the claw pole rotor towards a second side of the claw pole rotor. The second claw pole fingers extend from the second side towards the first side. The first side of the claw pole rotor is opposite the second side of the claw pole rotor. This means that, along the longitudinal axis of the claw pole rotor, the first side is arranged at one end of the claw pole rotor and the second side is arranged at the other end of the claw pole rotor. The first annular component of the first yoke-shaft component may be arranged at the first side. The second yoke-shaft component may be arranged at the second side. The first claw pole fingers may be connected to the first yoke-shaft component at the first side. The second claw pole fingers may be connected to the second yoke-shaft component at the second side. The first and second claw pole fingers may have a main extension direction that is parallel to the longitudinal axis of the claw pole rotor.

The first claw pole fingers and the second claw pole fingers may be arranged alternately along the circumference of the claw pole rotor. That is, along the circumference of the claw pole rotor, each first claw pole finger is arranged between two second claw pole fingers. Likewise, along the circumference of the claw pole rotor, each second claw pole finger is arranged between two first claw pole fingers. In this context, each first claw pole finger is arranged to be spaced apart from the respective adjacent second claw pole fingers. This means that a gap remains between each first claw pole finger and a second claw pole finger.

The first claw pole fingers may have a shape that tapers from the first side to the second side. The second claw pole fingers may have a shape that tapers from the second side to the first side. In each case, the extension of the claw pole fingers tapers along the circumference of the claw pole rotor. Further or alternatively, the shape of each of the first claw pole fingers may taper such that the first claw pole fingers have a greater extension in a radial direction in a cross-section through the claw pole rotor at the first side of the claw pole rotor than at a position not located at the first side. Further or alternatively, the shape of each of the second claw pole fingers may taper such that the second claw pole fingers have a greater extension in a radial direction in a cross-section through the claw pole rotor at the second side of the claw pole rotor than at a position not located at the second side.

A magnet is arranged between the first yoke-shaft component of the first claw pole component and the second yoke-shaft component of the second claw pole component. The magnet may be a permanent magnet. Between the first yoke-shaft component and the second yoke-shaft component, a cavity can be arranged in some places, in which cavity the magnet is arranged. The cavity may have the shape of a hollow cylinder. The cavity may extend along the longitudinal axis of the claw pole rotor. The cavity may have a shorter extension than the entire claw pole rotor. The magnet may be arranged entirely within the claw pole rotor. Further, the magnet may partially or completely fill the cavity. The magnet may extend within the claw pole rotor up to the second side. The second yoke-shaft component may have a shorter extension along the longitudinal axis of the claw pole rotor than the first yoke-shaft component. The magnet may have a longer extension along the longitudinal axis of the claw pole rotor than the second yoke-shaft component.

The arrangement of the magnet in the claw pole rotor causes the magnetic flux in the air gap of the electrical machine in which the claw pole rotor is used to be amplified during operation of the electrical machine. The magnet contributes to the magnetization of the first and second claw pole fingers. The claw pole fingers form the magnetic poles of the claw pole rotor. The magnet generates a magnetic flux in the claw pole rotor, which causes the first claw pole fingers to be magnetized in each case in the opposite direction as compared to the two adjacent second claw pole fingers. The magnet thus increases the magnetic flux in the claw pole rotor on the whole. An increased magnetic flux results in an increased torque of the electrical machine. Thus, the electrical machine can be operated more efficiently.

According to at least one embodiment of the claw pole rotor, the first yoke-shaft component, the magnet and the second yoke-shaft component are arranged to be coaxial with respect to one another at least in some places. This may mean that the first yoke-shaft component, the magnet and the second yoke-shaft component extend parallel to one another along the longitudinal axis of the claw pole rotor at least in some places. For example, the second yoke-shaft component forms, at least in some places, a hollow cylinder in which the magnet and the first yoke-shaft component are arranged. With this coaxial arrangement, the magnet can contribute to an amplification of the magnetic flux in the claw pole rotor.

According to at least one embodiment of the claw pole rotor, in a cross-section through the claw pole rotor, the magnet is arranged in a radial direction at least in some places between the first yoke-shaft component and the second yoke-shaft component. This may mean that, in a cross-section through the claw pole rotor along a radial direction, the magnet is arranged at least in some places between the first yoke-shaft component and the second yoke-shaft component. At least a portion of the magnet, in a cross-section through the claw pole rotor along a radial direction, may be arranged between the first yoke-shaft component and the second yoke-shaft component. The claw pole rotor may have the shape of a cylinder as a whole. The cross-section thus refers to a cross-section in which the claw pole rotor is shown as being circular. The claw pole rotor may have a longitudinal axis. The longitudinal axis of the claw pole rotor is perpendicular to said cross section. In this cross-section through the claw pole rotor, the second yoke-shaft component may be arranged in a radial direction at least in some places between the magnet, on the one hand, and the first and second claw pole fingers, on the other hand. In a cross-section through the claw pole rotor, the magnet may be arranged in a radial direction in some places between the first yoke-shaft component and the second yoke-shaft component. With this arrangement, the magnet may contribute to an amplification of the magnetic flux in the claw pole rotor.

According to at least one embodiment of the claw pole rotor, the magnet has the shape of a hollow cylinder. The magnet may extend along the longitudinal axis of the claw pole rotor. That is, the longitudinal axis of the hollow cylinder forming the magnet may be parallel to the longitudinal axis of the claw pole rotor. A magnet in the shape of a hollow cylinder can efficiently contribute to the amplification of the magnetic flux in the claw pole rotor.

According to at least one embodiment of the claw pole rotor, the diameter of the first yoke-shaft component is smaller than the diameter of the magnet and the diameter of the magnet is smaller than the diameter of the second yoke-shaft component. This may mean that in case the first yoke-shaft component, the magnet and the second yoke-shaft component have at least in some places the shape of a hollow cylinder, these three hollow cylinders have different diameters. The first yoke-shaft component has the smallest diameter and is arranged within the magnet at least in some places. The magnet has a smaller diameter than the second yoke-shaft component and is arranged within the second yoke-shaft component at least in some places. With this arrangement of the magnet in the claw pole rotor, the magnet can efficiently contribute to an amplification of the magnetic flux in the claw pole rotor.

According to at least one embodiment of the claw pole rotor, the extension of the magnet along a longitudinal axis of the claw pole rotor is shorter than the entire extension of the claw pole rotor along the longitudinal axis. That is, the magnet does not extend along the entire length of the claw pole rotor. With this arrangement, the magnet can be adjacent to the first yoke-shaft component and the second yoke-shaft component in such a manner that the magnet contributes to the magnetization of the first and second claw pole fingers. This means that the magnet amplifies the magnetic flux in the claw pole rotor in an advantageous way.

According to at least one embodiment of the claw pole rotor, the magnetization direction of the magnet in a cross-section through the claw pole rotor extends from an outer side of the claw pole rotor towards the center of the claw pole rotor. That is, the magnetization direction of the magnet in a cross section through the claw pole rotor runs parallel to the radial directions towards the center of the claw pole rotor. With this magnetization direction of the magnet, the magnet contributes to the magnetization of the first and second claw pole fingers and thus amplifies the magnetic flux in the claw pole rotor.

According to at least one embodiment of the claw pole rotor, the magnetization direction of the magnet in a cross-section through the claw pole rotor extends from the center of the claw pole rotor towards the outer side of the claw pole rotor. That is, the magnetization direction of the magnet in a cross section through the claw pole rotor runs parallel to the radial directions towards the outer side of the claw pole rotor. With this magnetization direction of the magnet, the magnet contributes to the magnetization of the first and second claw pole fingers and thus amplifies the magnetic flux in the claw pole rotor.

According to at least one embodiment of the claw pole rotor, the first claw pole component and the second claw pole component are arranged to be spaced apart from each other. This may mean that a gap remains between the first claw pole component and the second claw pole component. This gap may be the cavity in which the magnet is arranged. Furthermore, along the longitudinal axis of the claw pole rotor, a gap may remain between the first claw pole component and the second claw pole component. The first claw pole component and the second claw pole component are not in direct contact with each other. This advantageously avoids stray flux in the claw pole rotor.

According to at least one embodiment of the claw pole rotor, the magnet is in direct contact with the first yoke-shaft component and the second yoke-shaft component. The magnet may be in direct contact with the first yoke-shaft component on one of its sides and in direct contact with the second yoke-shaft component on another one of its sides. For example, an outer side of the magnet may be in direct contact with the second yoke-shaft component and an inner side of the magnet may be in direct contact with the first yoke-shaft component. The magnet may be in direct contact with the first yoke-shaft component and the second yoke-shaft component in those areas where the first yoke-shaft component, the magnet and the second yoke-shaft component are coaxially arranged. This allows for a compact design of the claw pole rotor and a magnetization of the claw pole fingers by the magnet. Further, it is possible that the first claw pole component and the second claw pole component are mechanically connected to each other via the magnet.

According to at least one embodiment of the claw pole rotor, an excitation coil is arranged between the claw pole fingers and the second yoke-shaft component. The excitation coil is arranged in a cross-section through the claw pole rotor in radial direction between the first and second claw pole fingers, on the one hand, and the second yoke-shaft component, on the other hand. The excitation coil is designed to be supplied with a direct current. The excitation coil may have the shape of a hollow cylinder. The excitation coil is arranged at a distance from the first and second claw pole fingers. This means that a gap remains between the excitation coil and the first and second claw pole fingers. By using the excitation coil, the magnetic flux in the air gap can be further amplified during operation of the electrical machine.

According to at least one embodiment of the claw pole rotor, at least one further magnet is arranged between the first yoke-shaft component and the second yoke-shaft component, and the magnet and the at least one further magnet are arranged along a ring. A plurality of further magnets may be arranged between the first yoke-shaft component and the second yoke-shaft component, and the magnet and the further magnets are arranged along a ring. The magnet and the at least one further magnet may be distributed along the circumference of the claw pole rotor. That is, the magnet and the at least one further magnet are arranged at different positions along the circumference of the claw pole rotor. The magnet and the further magnet may be arranged to be spaced apart from each other. The magnet and the further magnet may extend both along the longitudinal axis of the claw pole rotor and along the circumference of the claw pole rotor. The magnetization directions of the magnet and the further magnet, in a cross-section through the claw pole rotor, extend from an outer side of the claw pole rotor towards the center of the claw pole rotor or from the center towards the outer side. The magnet and the further magnet may be used in place of a single magnet in the shape of a hollow cylinder to amplify the magnetic flux in the claw pole rotor.

According to at least one embodiment of the claw pole rotor, a ferromagnetic material is arranged between the magnet and the at least one further magnet. The magnet and the further magnet may each be in direct contact with the ferromagnetic material. The ferromagnetic material may be connected to the first claw pole component or to the second claw pole component. In case the claw pole rotor has a plurality of further magnets, a ferromagnetic material is arranged between each two further magnets. The magnet together with the further magnets and the ferromagnetic material may be arranged in the shape of a hollow cylinder. This means that the magnet, the further magnets and the ferromagnetic material form a hollow cylinder in combination. Thus, the magnet and the further magnet can efficiently amplify the magnetic flux in the claw pole rotor.

According to at least one embodiment of the claw pole rotor, at least one magnet layer is arranged between the first yoke-shaft component and the second yoke-shaft component, the at least one magnet layer, as seen in a cross-section through the claw pole rotor, being arranged at a radial position which differs from that of the magnet. The magnet layer may have the same characteristics as the magnet. However, the size of the magnet layer differs from the size of the magnet. The magnet layer may be arranged so as to be coaxial with the magnet, the first yoke-shaft component and the second yoke-shaft component. The magnet layer may also have the shape of a hollow cylinder. The fact that the magnet layer is arranged at a different radial position than the magnet may mean that the magnet layer is arranged further inside or further outside in the claw pole rotor than the magnet.

According to at least one embodiment of the claw pole rotor, at least one first spacer is attached to the first claw pole component and extends so as to be parallel to the magnet at least in some places and/or at least one second spacer is attached to the second claw pole component and extends so as to be parallel to the magnet at least in some places. The first spacer may have the shape of a hollow cylinder. The first spacer may be arranged between the magnet and at least one magnet layer or between two magnet layers. Thus, the magnet and the magnet layer are not in direct contact. The first spacer may comprise a ferromagnetic material.

The second spacer may have the shape of a hollow cylinder. The second spacer may be arranged between the magnet and at least one magnet layer or between two magnet layers. The second spacer may comprise a ferromagnetic material.

The claw pole rotor may comprise either at least one first spacer or at least one second spacer to arrange the magnet and the at least one magnet layer at a distance from each other. It is further possible for the claw pole rotor to have at least one first spacer and at least one second spacer. The first spacer is arranged spaced apart from the second claw pole component along the longitudinal axis of the claw pole rotor. The second spacer is arranged spaced apart from the first claw pole component along the longitudinal axis of the claw pole rotor. This reduces stray flux in the claw pole rotor.

If a magnet and at least one magnet layer are used in the claw pole rotor, the extension of the magnet and the magnet layer in radial direction in a cross-section through the claw pole rotor can each be smaller than if only one magnet is used. This has the advantage that the internal resistance in a magnet and magnet layer with a smaller extension in radial direction is smaller than the internal resistance of a magnet with a larger extension in radial direction. Thus, the magnet and magnet layer can be used more efficiently to amplify the magnetic flux.

According to at least one embodiment of the claw pole rotor, the magnetization direction of the magnet in a cross-section through the claw pole rotor along a radial direction extends in the opposite direction as compared to the magnetization direction of at least one of the at least one magnet layer. This may mean that the magnetization direction of the magnet in a cross-section through the claw pole rotor extends from the center of the claw pole rotor towards the outer side of the claw pole rotor, and that the magnetization direction of the magnet layer extends from the outer side towards the center. Alternatively, the magnetization direction of the magnet in a cross-section through the claw pole rotor may extend from the outer side of the claw pole rotor towards the center of the claw pole rotor and the magnetization direction of the magnet layer may extend from the center towards the outer side. If the claw pole rotor has a plurality of magnet layers, the magnetization direction of every other magnet layer extends in the same direction. The magnetization direction in two adjacent magnet layers extends in different directions. This means that in a section through the claw pole rotor along its longitudinal axis, the magnetization directions of two adjacent magnet layers run in opposite directions in each case. In this way, the magnet and the magnet layer efficiently contribute to an amplification of the magnetic flux in the claw pole rotor.

In the following, the claw pole rotor described herein will be explained in more detail in connection with exemplary embodiments and the related Figures.

With FIGS. 3A, 3B, 3C, 3D and 3E, an exemplary embodiment of the claw pole rotor is described.

Figure 4A:
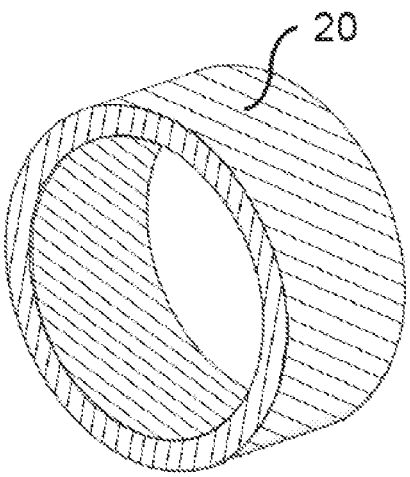
Figure 4B:
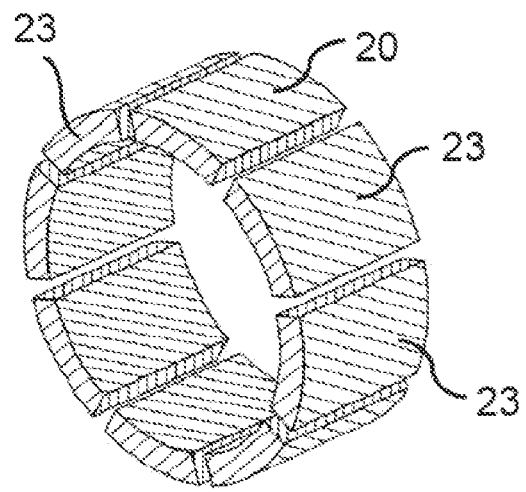

FIGS. 4A and 4B show magnets for exemplary embodiments of the claw pole rotor.

With FIGS. 5A, 5B, 5C, 5D, 5E, 5F and 5G, another exemplary embodiment of the claw pole rotor is described.

FIG. 6 shows another exemplary embodiment of the claw pole rotor.

Figure 7B:
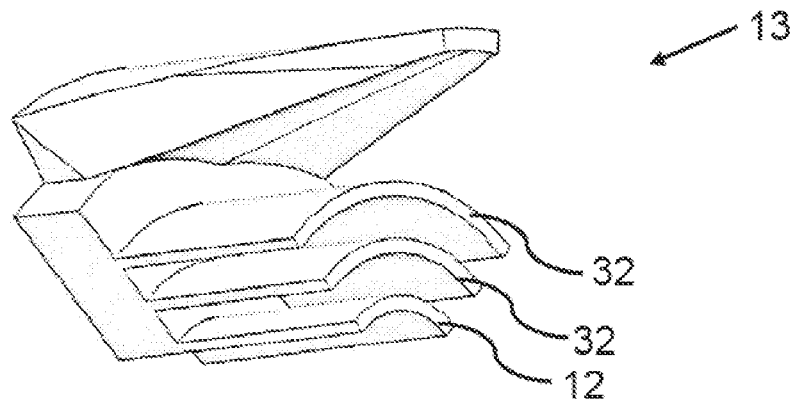
Figure 7C:
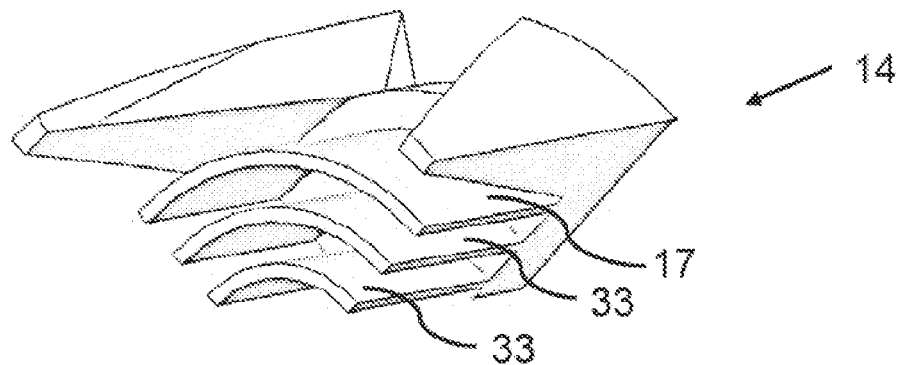

With FIGS. 7A, 7B and 7C, a further exemplary embodiment of the claw pole rotor is described.

Figure 8:
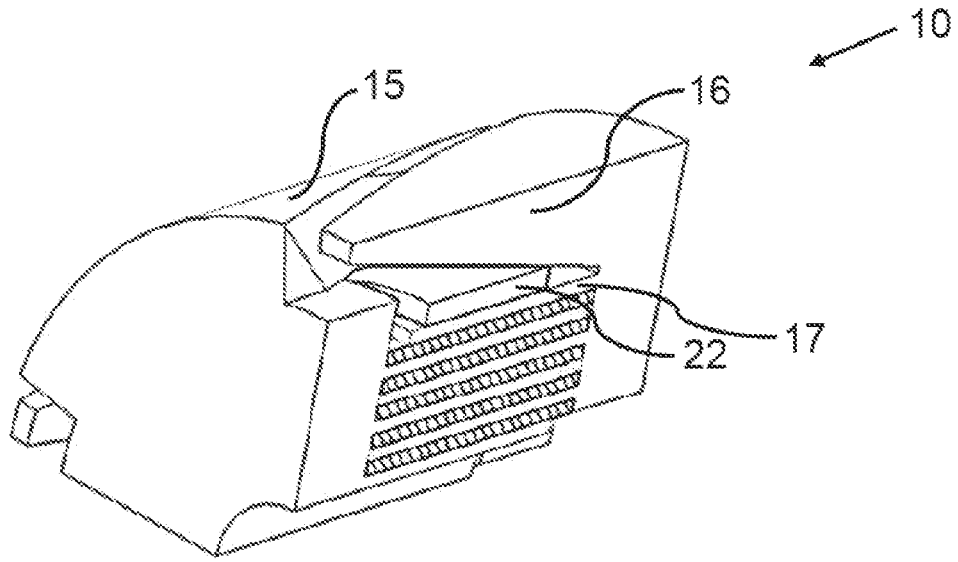

FIG. 8 shows another exemplary embodiment of the claw pole rotor.

Figure 9A:
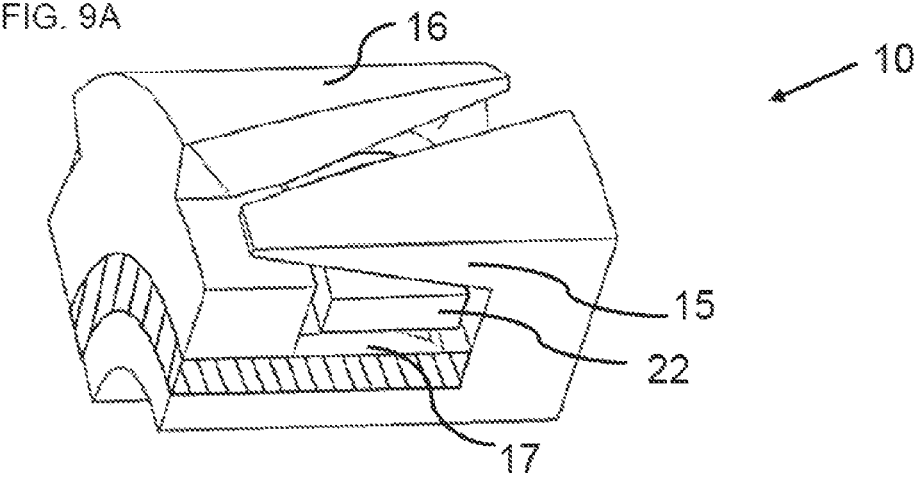
Figure 9B:
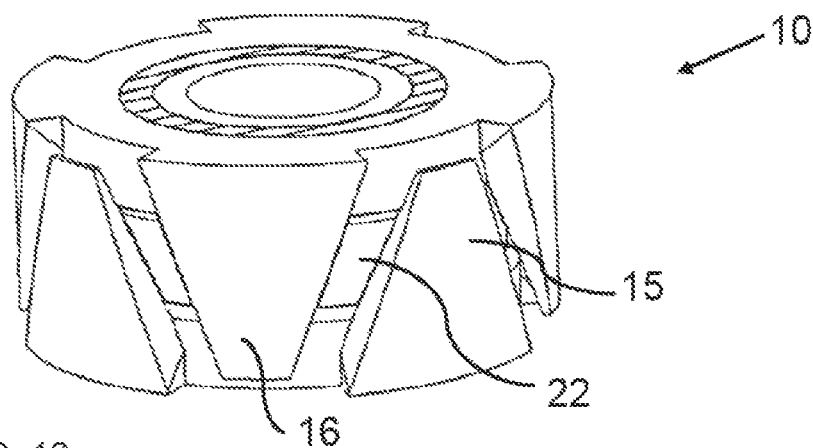

With FIGS. 9A and 9B, another exemplary embodiment of the claw pole rotor is described.

Figure 10:
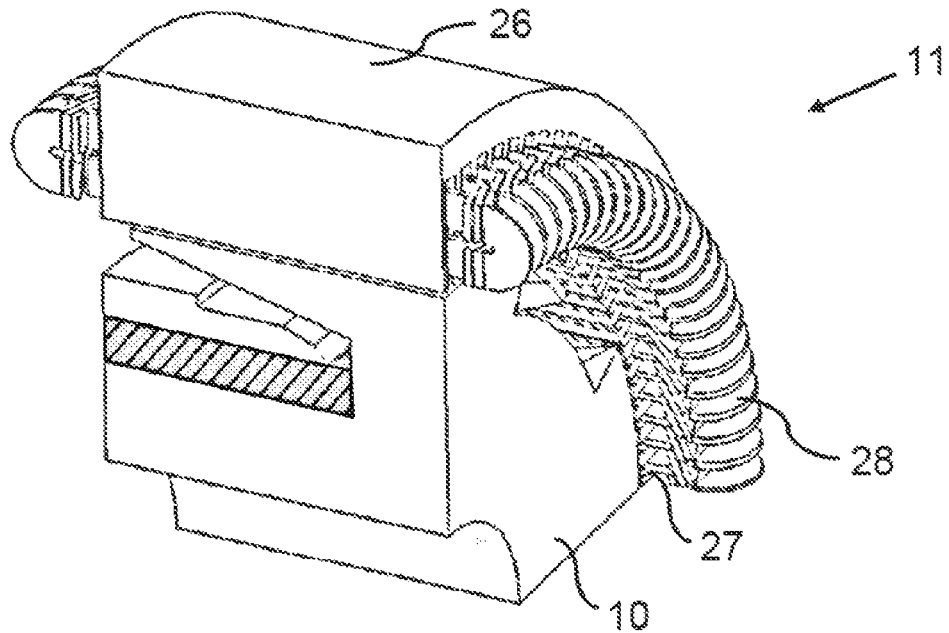

FIG. 10 shows a schematic cross-section through a portion of an electrical machine including an exemplary embodiment of the claw pole rotor.

Figure 1A:
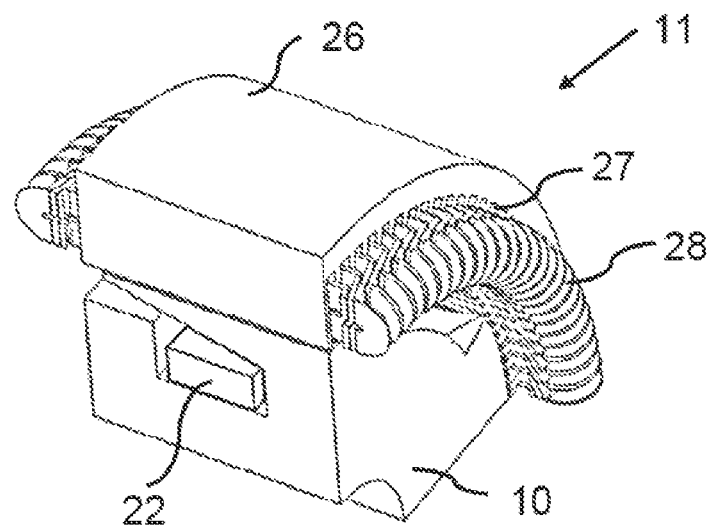
FIGS. 1A and 1B show a schematic cross-section through a portion of an example of an electrical machine.

FIG. 1A shows a schematic cross-section through a portion of an example of an electrical machine 11. The electrical machine 11 does not represent an exemplary embodiment. The electrical machine 11 includes a stator 26 and a claw pole rotor 10. The claw pole rotor 10 does not represent an exemplary embodiment. The stator 26 has a plurality of slots 27 in which an electrical winding 28 is arranged. The claw pole rotor 10 is arranged in the stator 26. The claw pole rotor 10 has an excitation coil 22.

Figure 1B:
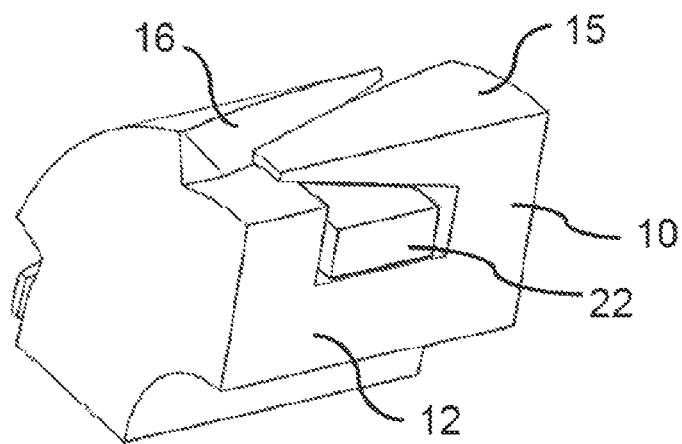

FIG. 1B shows a portion of the claw pole rotor 10 from FIG. 1A. It is shown that the excitation coil 22 is arranged between claw pole fingers 15, 16 and a first yoke-shaft component 12.

Figure 2A:
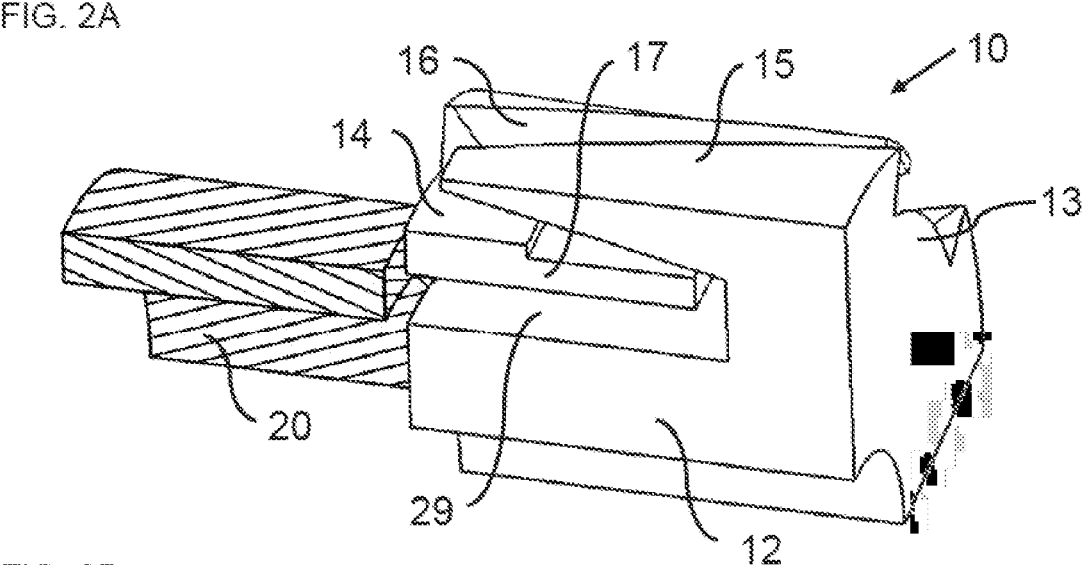
FIGS. 2A, 2B and 2C show a portion of an exemplary embodiment of the claw pole rotor.

FIG. 2A shows a part of an exemplary embodiment of the claw pole rotor 10 for an electrical machine 11. The claw pole rotor 10 includes a first claw pole component 13 having a first yoke-shaft component 12 to which at least two first claw pole fingers 15 are connected. The claw pole rotor 10 further comprises a second claw pole component 14 having a second yoke-shaft component 17 to which at least two second claw pole fingers 16 are connected. In FIG. 2A, a section through a portion of the claw pole rotor 10 is shown so that the interior of the claw pole rotor 10 is partially shown. A cavity 29 is arranged within the claw pole rotor 10. The cavity 29 is arranged between the first yoke-shaft component 12 and the second yoke-shaft component 17. A magnet 20 is placed in the cavity 29. To illustrate the structure of the claw pole rotor 10 and the cavity 29, the magnet 20 is shown spaced apart from the claw pole rotor 10.

Figure 2B:
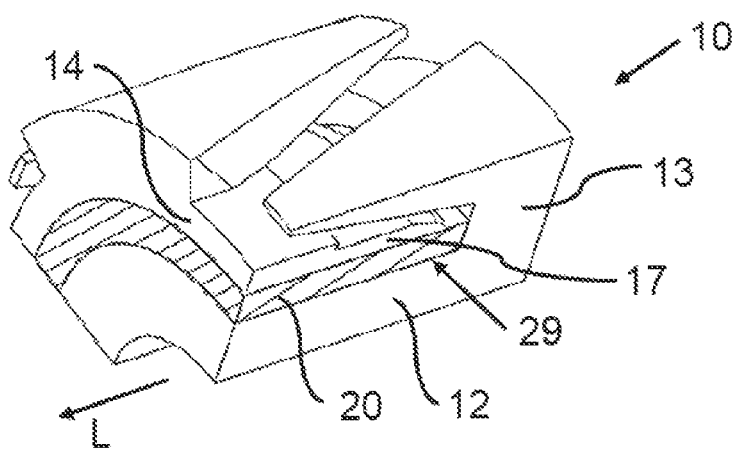

FIG. 2B illustrates the portion of FIG. 2A with the magnet 20 in the cavity 29. Again, only a portion of the claw pole rotor 10 is shown for illustrative purposes. The first yoke-shaft component 12, the magnet 20 and the second yoke-shaft component 17 are arranged to be coaxial to one another at least in some places. The first yoke-shaft component 12, the magnet 20 and the second yoke-shaft component 17 have the longitudinal axis L of the claw pole rotor 10 as a common axis of rotation. The extension of the magnet 20 along the longitudinal axis L of the claw pole rotor 10 is shorter than the entire extension of the claw pole rotor 10 along the longitudinal axis L. The magnet 20 completely fills the cavity 29. Thus, the magnet 20 is in direct contact with the first yoke-shaft component 12 and the second yoke-shaft component 17. However, the first claw pole component 13 and the second claw pole component 14 are spaced apart from each other. Thus, a gap remains between the second yoke-shaft component 17 and the first claw pole component 13. This gap is arranged above the magnet 20.

Figure 2C:
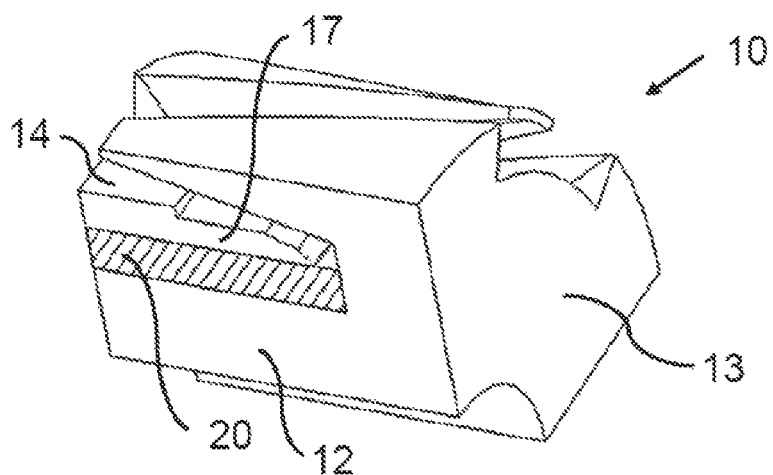

FIG. 2C illustrates a further view of the portion shown in FIG. 2B.

Figure 3A:
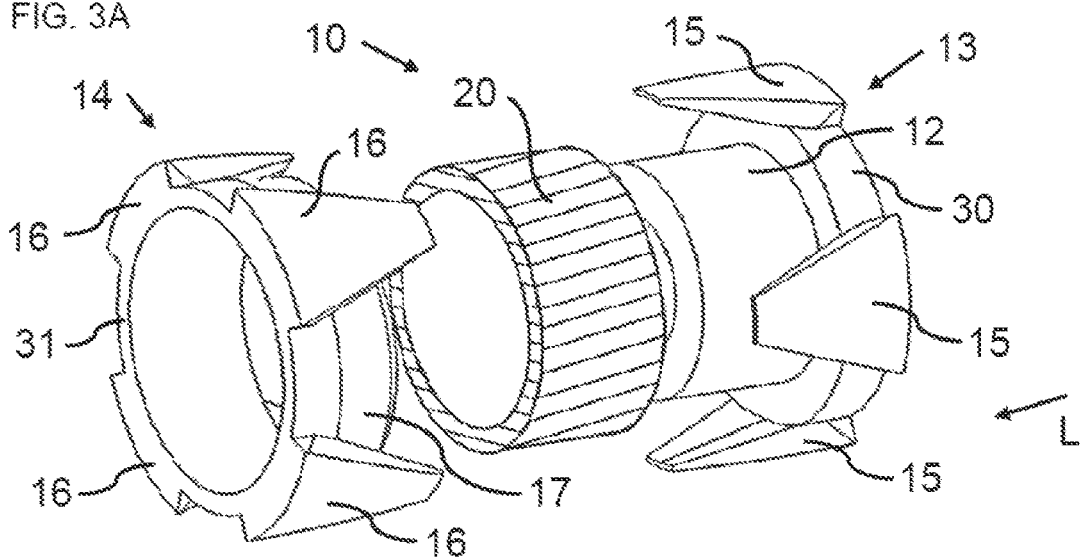
Figure 3B:
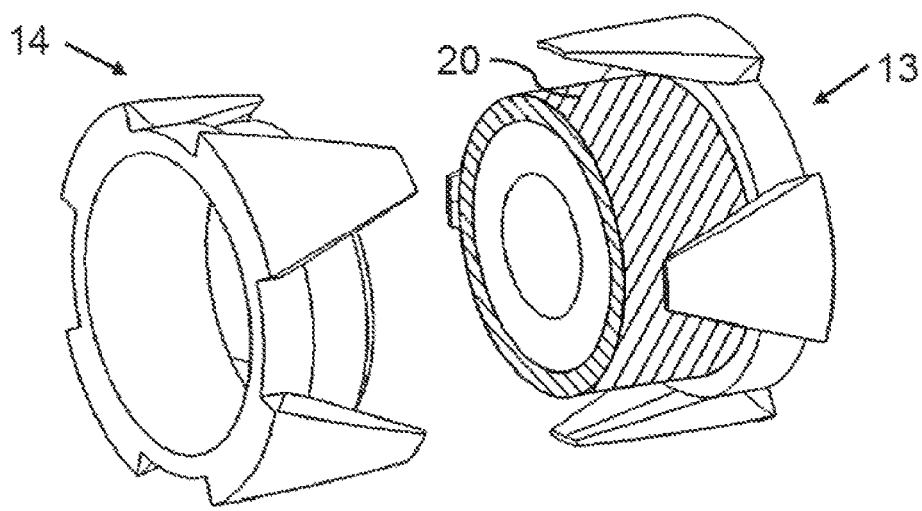
Figure 3C:
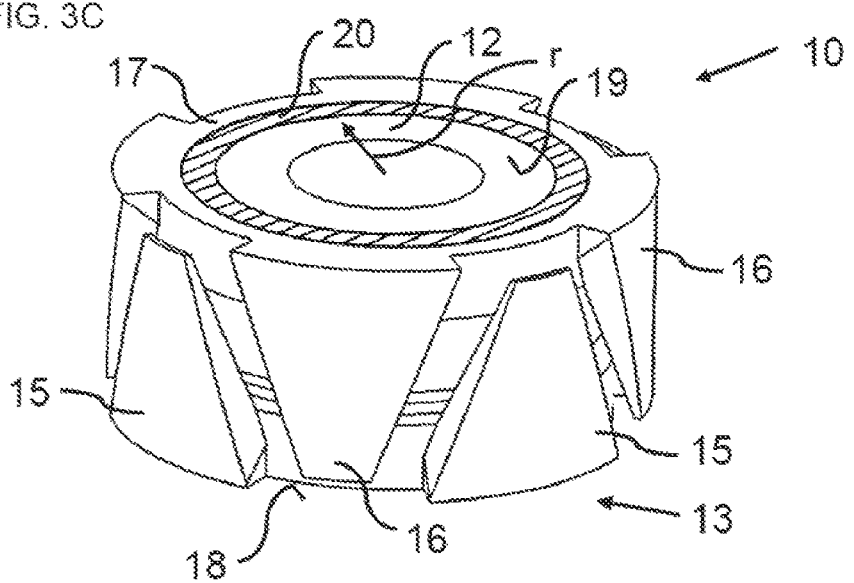

With FIGS. 3A, 3B and 3C, an exemplary embodiment of the claw pole rotor 10 is described. This is the same exemplary embodiment, a portion of which is shown in FIGS. 2A, 2B and 2C. In FIG. 3A, the claw pole rotor 10 is shown in a disassembled state. The claw pole rotor 10 comprises the first claw pole component 13, the magnet 20 and the second claw pole component 14. The first claw pole component 13 comprises the first yoke-shaft component 12, a first annular component 30 and the first claw pole fingers 15.

The first claw pole component 13 comprises a total of four first claw pole fingers 15. The first claw pole fingers 15 are connected to the first annular component 30. The first annular component 30 is connected to the first yoke-shaft component 12. The first yoke-shaft component 12 has the shape of a hollow cylinder and is arranged inside the claw pole rotor 10. The magnet 20 also has the shape of a hollow cylinder and is arranged inside the claw pole rotor 10. The second claw pole component 14 comprises the second yoke-shaft component 17, a second annular component 31 and the second claw pole fingers 16. The second claw pole component 14 comprises a total of four second claw pole fingers 16. The second claw pole fingers 16 are connected to the second annular component 31. The second annular component 31 is connected to the second yoke-shaft component 17. The second yoke-shaft component 17 has the shape of a hollow cylinder. The second yoke-shaft component 17 has a shorter extension along the longitudinal axis L of the claw pole rotor 10 than the first yoke-shaft component 12.

In FIG. 3B, the magnet 20 in the illustration from FIG. 3A is arranged at the first claw pole component 13. The second claw pole component 14 is further arranged to be spaced apart for illustration purposes.

FIG. 3C illustrates an exemplary embodiment of the claw pole rotor 10 in the assembled state. The first claw pole fingers 15 extend from a first side 18 of the claw pole rotor 10 towards a second side 19 of the claw pole rotor 10. The second claw pole fingers 16 extend from the second side 19 towards the first side 18. The magnet 20 is arranged between the first yoke-shaft component 12 of the first claw pole component 13 and the second yoke-shaft component 17 of the second claw pole component 14. The magnet 20 extends up to the second side 19. In a cross-section through the claw pole rotor 10, the magnet 20 is arranged in a radial direction r at least in some places between the first yoke-shaft component 12 and the second yoke-shaft component 17. The diameter of the first yoke-shaft component 12 is smaller than the diameter of the magnet 20, and the diameter of the magnet 20 is smaller than the diameter of the second yoke-shaft component 17. Thus, the first yoke-shaft component 12, the magnet 20 and the second yoke-shaft component 17 are at least in some places coaxially arranged with respect to one another. The first claw pole fingers 15 are arranged to be spaced apart from the second claw pole fingers 16.

Figure 3D:
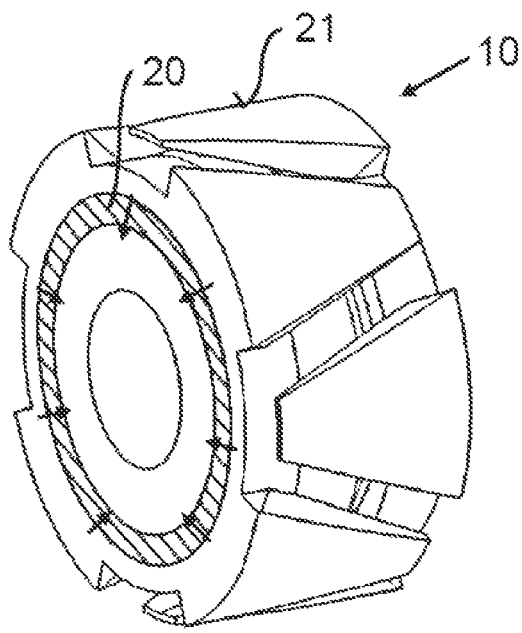

FIG. 3D illustrates the exemplary embodiment shown in FIG. 3C. Unlike FIG. 3C, the magnetization direction of the magnet 20 is shown with arrows. In a cross-section through the claw pole rotor 10, the magnetization direction of the magnet 20 extends from an outer side 21 of the claw pole rotor 10 towards the center of the claw pole rotor 10.

Figure 3E:
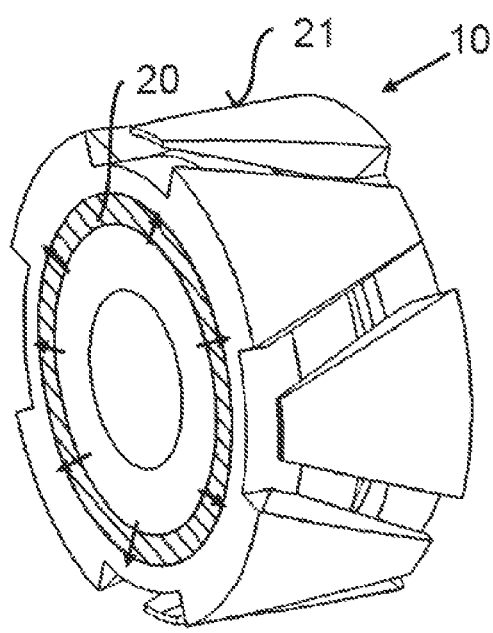

In FIG. 3E, the exemplary embodiment shown in FIG. 3D is illustrated, with the only difference that the magnetization direction of the magnet 20 extends from the center of the claw pole rotor 10 towards the outer side 21 of the claw pole rotor 10.

FIG. 4A illustrates a magnet 20 for an exemplary embodiment of the claw pole rotor 10. The magnet 20 has the shape of a hollow cylinder.

In FIG. 4B, a magnet 20 and further magnets 23 are illustrated for an exemplary embodiment of the claw pole rotor 10. The further magnets 23 may also be permanent magnets. The further magnets 23 are arranged in the claw pole rotor 10 like the magnet 20 between the first yoke-shaft component 12 and the second yoke-shaft component 17. The magnet 20 and the further magnets 23 are arranged along a ring.

Figure 5A:
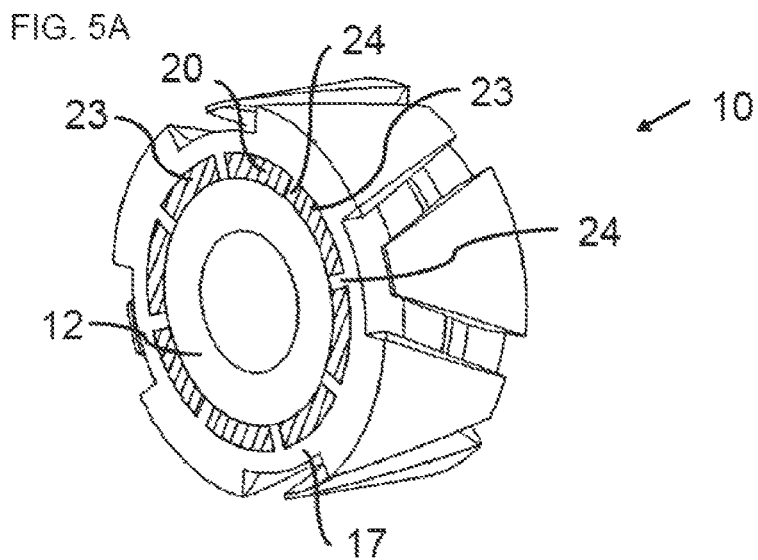

With the FIGS. 5A, 5B, 5C, 5D, 5E, 5F and 5G, another exemplary embodiment of the claw pole rotor 10 is described. FIG. 5A illustrates another exemplary embodiment of the claw pole rotor 10. The claw pole rotor 10 has the structure shown in FIG. 3C, except that the claw pole rotor 10 has a magnet 20 and seven further magnets 23. The magnet 20 and the further magnets 23 are arranged along a ring between the first yoke-shaft component 12 and the second yoke-shaft component 17. In this regard, a ferromagnetic material 24 is arranged between the magnet 20 and the adjacent further magnets 23 and between each two further magnets 23. Thus, the magnet 20 and the further magnets 23 are all arranged at a distance from one another.

Figure 5B:
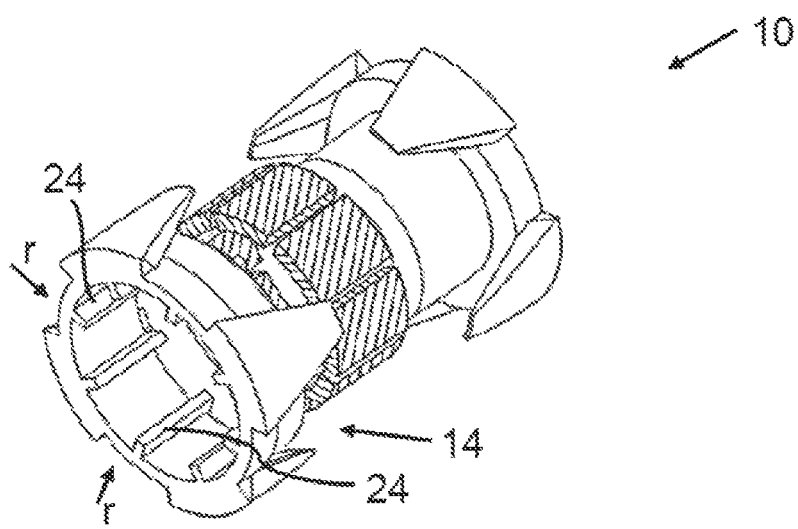

In FIG. 5B, the exemplary embodiment shown in FIG. 5A is shown in the disassembled state for illustration. Here, it is shown that the ferromagnetic material 24 is connected to the second claw pole component 14 in each case. The ferromagnetic material 24 may be formed as webs which are integrally formed with the second claw pole component 14. The webs extend along radial directions r in a cross-section through the claw pole rotor 10.

Figure 5C:
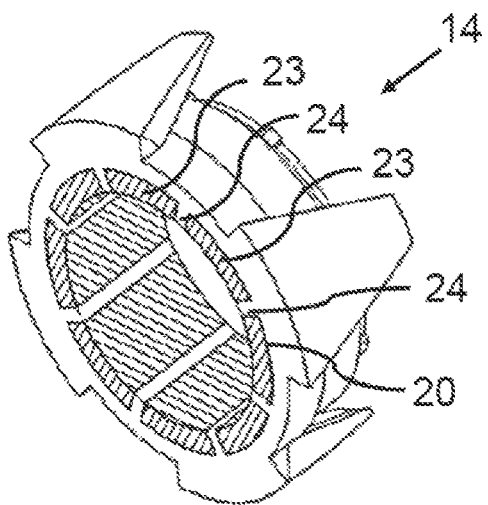

FIG. 5C shows the second claw pole component 14 of FIG. 5B with the magnet 20 and the further magnets 23. The magnet 20 and the further magnets 23 are all arranged between the ferromagnetic material 24, which is attached to the second claw pole component 14.

Figure 5D:
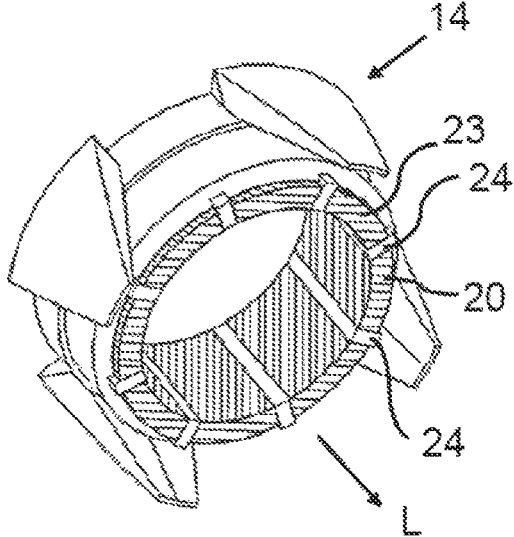

FIG. 5D shows a further view of the second claw pole component 14 of FIG. 5C. The ferromagnetic material 24 extends as far as the magnet 20 and the other magnets 23 along the longitudinal axis L of the claw pole rotor 10.

FIG. 5E illustrates the second claw pole component 14 of FIG. 5C without the magnet 20 and the further magnets 23.

FIG. 5F illustrates the magnet 20 and the further magnets 23 of FIG. 5C separately.

In FIG. 5G, the first claw pole component 13 of FIG. 5A is shown separately.

In FIG. 6, another exemplary embodiment of the claw pole rotor 10 is shown. The claw pole rotor 10 has the structure shown in FIG. 5A except that an excitation coil 22 is arranged between the first and second claw pole fingers 15, 16 and the second yoke-shaft component 17. The excitation coil 22 has the shape of a hollow cylinder.

FIGS. 7A, 7B and 7C describe another exemplary embodiment of the claw pole rotor 10. In FIG. 7A, a portion of the exemplary embodiment is shown. A section through the claw pole rotor 10 is shown. In contrast to the exemplary embodiment shown in FIG. 3C, the magnet 20 and four magnet layers 25 are arranged between the first yoke-shaft component 12 and the second yoke-shaft component 17. The magnet 20 and the magnet layers 25 are respectively arranged at a different radial position in a cross-section through the claw pole rotor 10. That is, the magnet 20 and the magnet layers 25 are respectively arranged at different radial positions in a cross-section through the claw pole rotor 10. The magnet layers 25 can each be a permanent magnet. The magnet layers 25 all have the shape of a hollow cylinder. Like the magnet 20, the magnet layers 25 are all arranged in a cavity 29 in the claw pole rotor 10. Here, the magnet layers 25 are each in direct contact with the first claw pole component 13 and the second claw pole component 14.

Two first spacers 32 are attached to the first claw pole component 13. The first spacers 32 extend parallel to the magnet 20 and the magnet layers 25. The first spacers 32 all have the shape of a hollow cylinder. The first spacers 32 are each in direct contact with the magnet 20 or a magnet layer 25. The first spacers 32 are arranged, in a cross-section through the claw pole rotor 10 in the radial direction r, between each two magnet layers 25 or between the magnet 20 and a magnet layer 25. Thus, the first spacers 32 are intended to be arranged between the magnet 20 and the magnet layers 25 and to maintain a distance between these. The first spacers 32 are arranged to be spaced apart from the second claw pole component 14. That is, a gap is left between the first spacers 32 and the second claw pole component 14. This reduces stray flux in the claw pole rotor 10.

Two second spacers 33 are attached to the second claw pole component 14. The second spacers 33 extend parallel to the magnet 20 and the magnet layers 25. The second spacers 33 all have the shape of a hollow cylinder. The second spacers 33 are each in direct contact with the magnet 20 or a magnet layer 25. The second spacers 33 are arranged, in a cross-section through the claw pole rotor 10 in the radial direction r, between each two magnet layers 25. Thus, the second spacers 33 are intended to be arranged between the magnet layers 25 and maintain a distance between these. The second spacers 33 are arranged to be spaced apart from the first claw pole component 13. This means that a gap remains between the second spacers 33 and the first claw pole component 13. This reduces stray flux in the claw pole rotor 10. The first spacers 32 and the second spacers 33 are arranged alternately along a radial direction r in a cross-section through the claw pole rotor 10. FIG. 7A also shows two portions of the illustrated part of the claw pole rotor 10 in an enlarged view.

In a cross-section through the claw pole rotor 10 along a radial direction r, the magnetization direction of the magnet 20 extends in the opposite direction as compared to the magnetization direction of the adjacent magnet layer 25. For each two adjacent magnet layers 25, the magnetization directions in a cross-section through the claw pole rotor 10 along a radial direction extend in opposite directions compared to each other. The magnetization directions are shown by arrows in the left magnification in FIG. 7A. In a cross-section through the claw pole rotor 10, the magnetization directions run along radial directions r either from the outer side 21 to the center of the claw pole rotor 10 or from the center of the claw pole rotor 10 to the outer side 21.

FIG. 7B shows a portion of the first claw pole component 13 of FIG. 7A with two first spacers 32 and the first yoke-shaft component 12. Since only a portion is shown, the first spacers 32 all have only the shape of an arc. On the whole, each first spacer 32 has the shape of a hollow cylinder.

FIG. 7C shows a portion of the second claw pole component 14 from FIG. 7A with two second spacers 33. Since only a portion is shown, the second spacers 33 all have the shape of an arc. On the whole, each second spacer 33 has the shape of a hollow cylinder.

FIG. 8 shows a portion of another exemplary embodiment of the claw pole rotor 10. The claw pole rotor 10 has the structure shown in FIG. 7A. In addition, an excitation coil 22 is arranged between the first and second claw pole fingers 15, 16, on the one hand, and the second yoke-shaft component 17, on the other hand.

With FIGS. 9A and 9B, a further exemplary embodiment of the claw pole rotor 10 is described. In FIG. 9A, a portion of the claw pole rotor 10 is shown. The claw pole rotor 10 has the structure shown in FIG. 3C and additionally comprises an excitation coil 22 between the first and second claw pole fingers 15, 16 and the second yoke-shaft component 17.

FIG. 9B illustrates the entire claw pole rotor 10 according to the exemplary embodiment shown in FIG. 9A.

In FIG. 10, a schematic cross-section through a portion of an electrical machine 11 including an exemplary embodiment of the claw pole rotor 10 is shown. The claw pole rotor 10 is the exemplary embodiment shown in FIG. 3C. The claw pole rotor 10 is arranged in a stator 26 of the electrical machine 11. The stator 26 has a plurality of slots 27 in which an electrical winding 28 is arranged.

This patent application claims priority from German patent application 10 2021 104 270.4, the disclosure content of which is hereby included by reference.

The invention claimed is:

1. A claw pole rotor for an electrical machine, the claw pole rotor comprising:
a first claw pole component having a first yoke-shaft component to which at least two first claw pole fingers are connected;
a second claw pole component having a second yoke-shaft component to which at least two second claw pole fingers are connected, wherein:
the first claw pole fingers extend from a first side of the claw pole rotor towards a second side of the claw pole rotor; and
the second claw pole fingers extend from the second side towards the first side; and
a magnet arranged between the first yoke-shaft component of the first claw pole component and the second yoke-shaft component of the second claw pole component,
wherein:
at least one magnet layer is arranged between the first yoke-shaft component and the second yoke-shaft component, wherein the at least one magnet layer, as seen in a cross-section through the claw pole rotor, is arranged at a radial position which differs from that of the magnet; and
a magnetization direction of the magnet as seen in a cross-section through the claw pole rotor along a radial direction extends in an opposite direction as compared to a magnetization direction of at least one of the at least one magnet layer.

2. The claw pole rotor according to claim 1, wherein the first yoke-shaft component, the magnet and the second yoke-shaft component are arranged to be coaxial with respect to one another at least in some places.

3. The claw pole rotor according to claim 1, wherein, in a cross-section through the claw pole rotor, the magnet is arranged in a radial direction (r) at least in some places between the first yoke-shaft component and the second yoke-shaft component.

4. The claw pole rotor according to claim 1, wherein the magnet has a shape of a hollow cylinder.

5. The claw pole rotor according to claim 1, wherein a diameter of the first yoke-shaft component is smaller than a diameter of the magnet, and the diameter of the magnet is smaller than a diameter of the second yoke-shaft component.

6. The claw pole rotor according to claim 1, wherein an extension of the magnet along a longitudinal axis (L) of the claw pole rotor is shorter than an entire extension of the claw pole rotor along the longitudinal axis (L).

7. The claw pole rotor according to claim 1, wherein the magnetization direction of the magnet in a cross-section through the claw pole rotor runs from an outer side of the claw pole rotor towards the center of the claw pole rotor.

8. The claw pole rotor according to claim 1, wherein the first claw pole component and the second claw pole component are arranged to be spaced apart from each other.

9. The claw pole rotor according to claim 1, wherein the magnet is in direct contact with the first yoke-shaft component and the second yoke-shaft component.

10. The claw pole rotor according to claim 1, wherein an excitation coil is arranged between the first and second claw pole fingers and the second yoke-shaft component.

11. The claw pole rotor according to claim 1, wherein at least one further magnet is arranged between the first yoke-shaft component and the second yoke-shaft component, and the magnet and the at least one further magnet are arranged along a ring.

12. The claw pole rotor according to claim 1, wherein a ferromagnetic material is arranged between the magnet and the at least one further magnet.

13. The claw pole rotor according to claim 1, wherein at least one first spacer is attached to the first claw pole component and extends so as to be parallel to the magnet at least in some places and/or wherein at least one second spacer is attached to the second claw pole component and extends so as to be parallel to the magnet at least in some places.

14. A claw pole rotor for an electrical machine, the claw pole rotor comprising:
- a first claw pole component having a first yoke-shaft component to which at least two first claw pole fingers are connected;
- a second claw pole component having a second yoke-shaft component to which at least two second claw pole fingers are connected, wherein:
  - the first claw pole fingers extend from a first side of the claw pole rotor towards a second side of the claw pole rotor; and
  - the second claw pole fingers extend from the second side towards the first side; and
- a magnet arranged between the first yoke-shaft component of the first claw pole component and the second yoke-shaft component of the second claw pole component, wherein:
in a cross-section through the claw pole rotor, the magnet is arranged in a radial direction at least in some places between the first yoke-shaft component and the second yoke-shaft component.

15. A claw pole rotor for an electrical machine, the claw pole rotor comprising:
- a first claw pole component having a first yoke-shaft component to which at least two first claw pole fingers are connected;
- a second claw pole component having a second yoke-shaft component to which at least two second claw pole fingers are connected, wherein:
  - the first claw pole fingers extend from a first side of the claw pole rotor towards a second side of the claw pole rotor; and
  - the second claw pole fingers extend from the second side towards the first side; and
- a magnet arranged between the first yoke-shaft component of the first claw pole component and the second yoke-shaft component of the second claw pole component, wherein:
the first yoke-shaft component, the magnet and the second yoke-shaft component are arranged to be coaxial with respect to one another at least in some places.

* * * * *